United States Patent [19]

Schumacher

[11] Patent Number: 4,964,722

[45] Date of Patent: Oct. 23, 1990

[54] REMOTE OBJECT CONFIGURATION/ORIENTATION DETERMINATION

[75] Inventor: Larry L. Schumacher, Newhall, Calif.

[73] Assignee: The United States of America as represented by the Administrator of the National Aeronautics and Space Administration, Washington, D.C.

[21] Appl. No.: 237,035

[22] Filed: Aug. 29, 1988

[51] Int. Cl.⁵ .................... G01B 11/26; G01C 1/00; G01C 3/08

[52] U.S. Cl. ...................................... 356/152; 356/5; 356/141

[58] Field of Search ........................... 356/5, 141, 152

[56] References Cited

U.S. PATENT DOCUMENTS

| | | | |
|---|---|---|---|
| 3,542,472 | 11/1970 | Smith-Vaniz | 356/4 |
| 3,690,767 | 9/1972 | Missio et al. | 356/5 |
| 3,698,816 | 10/1972 | Lutchansky | 356/152 |
| 3,866,229 | 2/1975 | Hammack | 356/141 |
| 3,961,851 | 6/1976 | Gerharz | 356/1 |
| 4,047,816 | 9/1977 | Pell et al. | 356/152 |
| 4,123,165 | 10/1978 | Brown et al. | 356/152 |
| 4,134,681 | 1/1979 | Elmer | 356/152 |
| 4,209,254 | 6/1980 | Reymond et al. | 356/152 |
| 4,261,107 | 4/1981 | Coleman et al. | 33/174 L |
| 4,356,640 | 4/1982 | Dreyfus et al. | 356/376 |
| 4,373,808 | 2/1983 | Pell et al. | 356/152 |
| 4,402,608 | 9/1983 | DiMatteo et al. | 356/375 |
| 4,529,316 | 7/1985 | DiMatteo | 356/376 |
| 4,534,650 | 8/1985 | Clerget et al. | 356/376 |
| 4,789,243 | 12/1988 | Mathur | 356/375 |

Primary Examiner—Stephen C. Buczinski
Attorney, Agent, or Firm—Thomas H. Jones; John R. Manning

[57] ABSTRACT

A method for determining the configuration and location of an object with respect to an X, Y, X coordinate frame. The exterior surface of the sobject is equipped with a plurality of retroreflector surfaces capable of reflecting range measuring laser beams back to their sources. Three lasers, "A", "B", and "C", are located orthogonally to one another to define the reference coordinate frame. The lasers are used to determine the range distance to each of the retroreflector surface within the coordinate frame. The space defined by the coordinate frame is divided into four quadrants and the location of the retroreflector within a particular quadrant determines the value of variables qx and qy to be used in association therewith. Then, for each retroreflector$_n$, the measured ranges from the laser to the retroreflector are designated as $RA_n$, from laser A, $RB_n$ from laser B and $RC_n$ from laser C. Finally the positional values of each retroreflector are calculated according to geometric relationships, whereby the configuration of the object within the coordinate frame is determined.

3 Claims, 2 Drawing Sheets

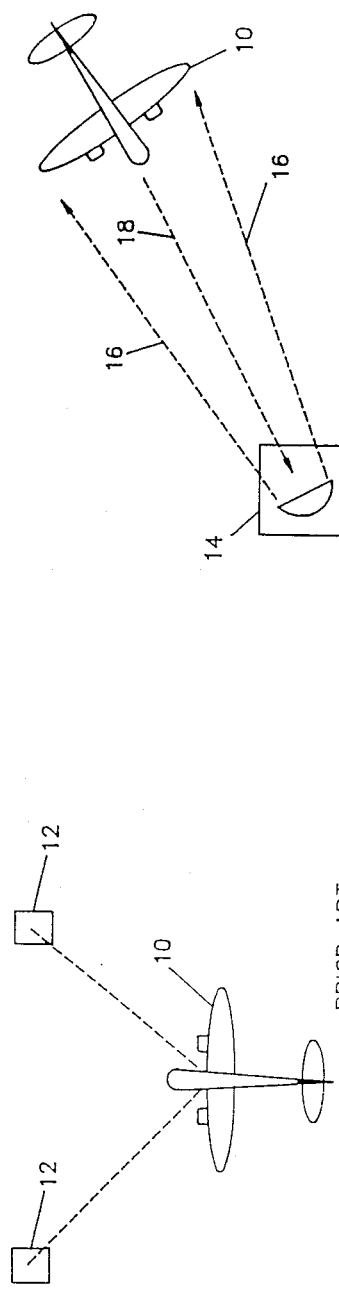
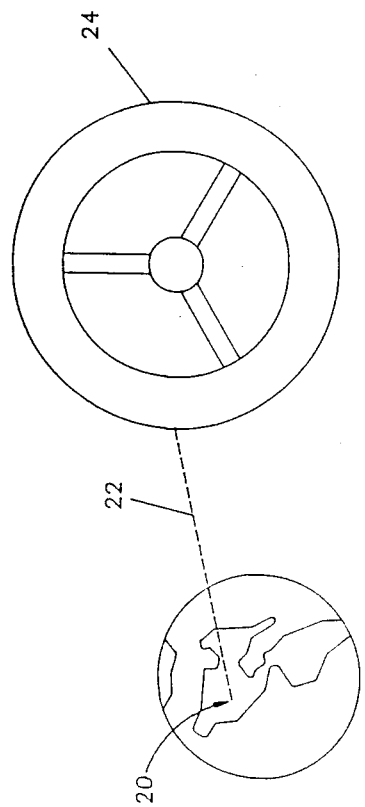
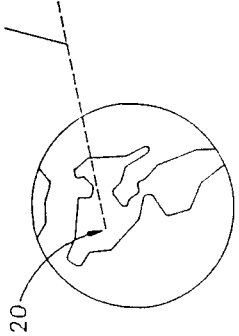
FIG. 1 PRIOR ART
FIG. 2 PRIOR ART
FIG. 3

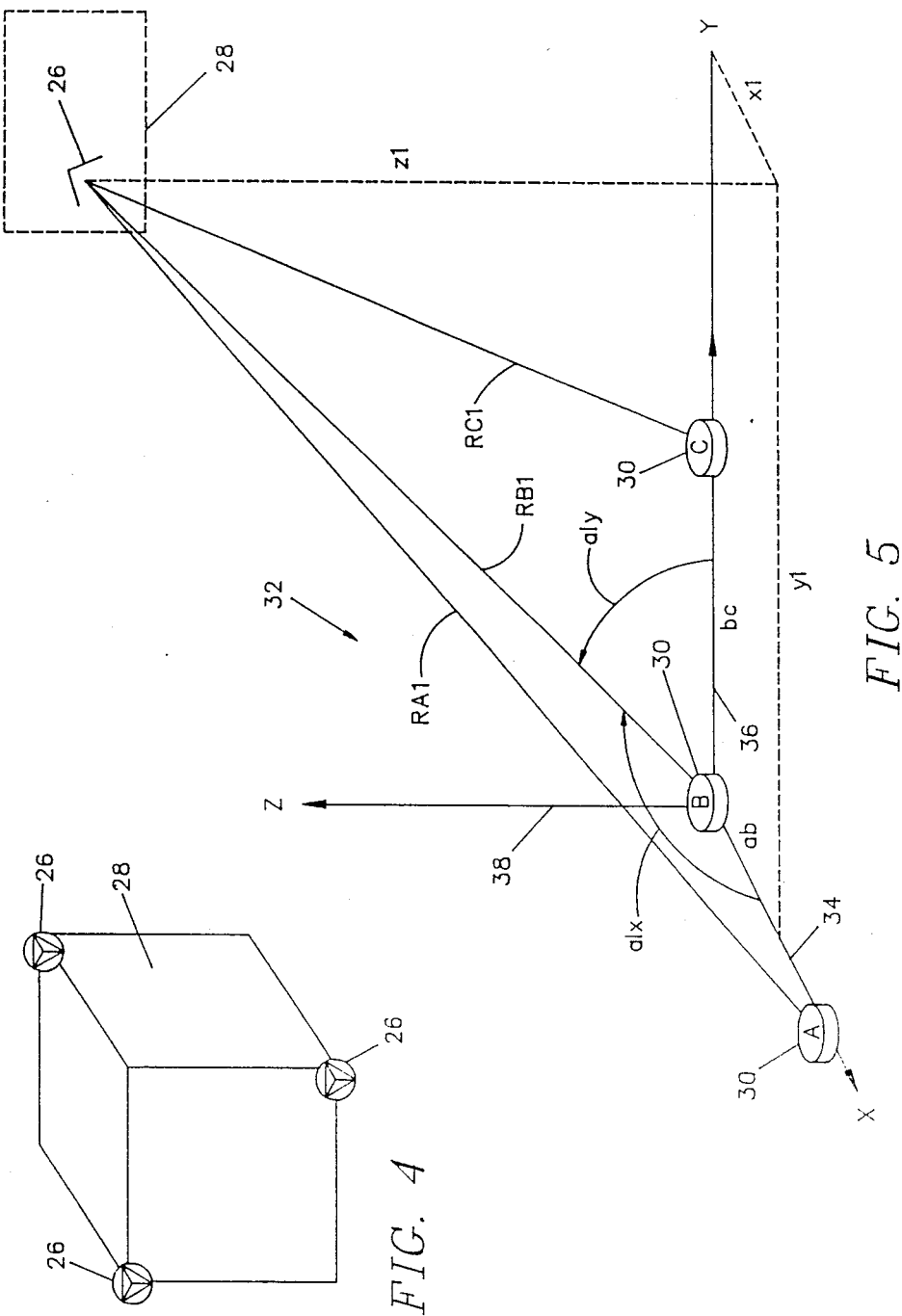

REMOTE OBJECT CONFIGURATION/ORIENTATION DETERMINATION

ORIGIN OF THE INVENTION:

The invention described herein was made in the performance of work under a NASA contract, and is subject to the provisions of Public Law 96-517 (35 USC 202) in which the Contractor has elected not to retain title.

TECHNICAL FIELD:

The invention relates to object detection and location systems and, more particularly, to the method of determining the configuration and location of an object with respect to an X, Y, X coordinate frame comprising the steps of, equipping the exterior surface of the object with a plurality of retroreflector surfaces capable of reflecting range measuring laser beams back to their sources; locating three lasers, "A", "B", and "C", orthogonally to one another such that laser "B" defines the origin of the reference coordinate frame, laser "A" defines an X axis, and laser "C" defines a Y axis with a Z axis normal to a plane defined by the three lasers whereby to define the reference coordinate frame; employing the lasers to determine the range distance to each of the retroreflector surface within the coordinate frame by reflecting laser beams from the retroreflector surfaces; dividing the space defined by the coordinate frame into four quadrants; for each retroreflector, using the location of the retroreflector within a particular quadrant to determine the value of variables qx and qy to be used in association therewith according to the following relationship,

| Quadrant | X polarity | Y polarity | qx value | qx value |
|---|---|---|---|---|
| I | positive | positive | 0 | 0 |
| II | positive | negative | 1 | 0 |
| III | negative | negative | 1 | 1 |
| IV | negative | positive | 0 | 1 | where the values of X, Y, and Z are defined as positive going towards lasers A and C from laser B and Z is taken as positive going upward from the X-Y plane; and for each retroreflector$_n$ designating the measured ranges from the laser to the retroreflector as $RA_n$, from laser A, $RB_n$ from laser B and $RC_n$ from laser C; and, calculating the positional values according to the following geometric relationships:

the angle alx between the X axis and the measured range $RB_n$ being, $$alx = \frac{Cos^{-1}[(RB_n)^2 + (ab)^2 - (RA_n)^2]}{2ab(RB_n)}$$

the X axis coordinate x1 of the retroreflector being, $$x1 = (RB_n)[Cos(alx)][(-1)^{qx}]$$

the angle aly between the Y axis and the measured range $RB_n$ being, $$aly = \frac{Cos^{-1}[(RB_n)^2 + (bc)^2 - (RC_n)^2]}{2bc(RB_n)}$$

the Y axis coordinate y1 of the retroreflector being, $$y1 = (RB_n)[Cos(aly)][(-1)^{qy}]$$

and, the Z axis coordinate Z1 of the retroreflector being, $$z1 = [(RB_n)^2 - (x1)^2 - (y1)^2]^{-1}$$

whereby the configuration of the object within the coordinate frame is determined.

BACKGROUND ART

In the field of object detection and location systems, it is well known how to locate objects and determine their position relative to the Earth's surface. For example, as depicted in FIG. 1, an airplane 10 can calculate its position by employing a directional antenna to determine the direction from the airplane 10 to a pair of radio broadcasting transmitters 12 whose location is known. Likewise, as depicted in FIG. 2, a radar site 14 can determine the direction and range of the airplane 10 by transmitting radar pulses 16 and detecting the return signals 18 from the airplane 10. As is well known and as world events continually demonstrate, the radar system of FIG. 2, cannot determine object orientation. For example the airplane 10 shows up on a CRT radar display as a "blip" or dot of light. It is asssumed that the airplane 10 is oriented in the direction of movement of the bilip. It could be flying upside down, however, and the radar operator would not be able to determine that fact. Likewise, a helicopter flying backwards or sidewards would be assumed to be flying in a forward direction from the few facts available to the radar operator.

In space applications in particular, there is a need to be able to determine the orientation of an object at a distance. As depicted in FIG. 3, there are instances where an operator at a site 20 on Earth has need to be able to send some sort of beam 22 to an orbiting space station 24, or the like, and passively determine therefrom the orientation of the station 24 relative to an Earth-oriented coordinate system. Such inputs would be desirable and necessary, for example, in the control of large, flexible space structures. At present, there is no available method or apparatus which will allow the operator to make such a determination. A similar problem and need exists in robotic applications. While the need has been continuous and computers have been available to provide the computational capability required, to date there has been no system capable of harnessing the computer's capability to solve the problem.

STATEMENT OF THE INVENTION

Accordingly, it is an object of the invention to provide a method and associated apparatus for determining the orientation of a remotely deployed object.

It is another object of the invention to provide a method and associated apparatus for determining the spatial orientation of an object in space with relation to an Earthoriented coordinate system.

It is yet another object of the invention to provide a system for remotely defining an object's configuration in a manner compatible with a computer's analytical capability.

Other objects and benefits of the invention will become apparent from the description which follows hereinafter when taken in conjunction with the drawing figures which accompany it.

BRIEF DESCRIPTION OF THE DRAWINGS

FIG. 1 is a simplified drawing showing a prior art system for determining position on the Earth from the direction to a pair of remote broadcasting stations.

FIG. 2 is a simplified drawing showing a prior art radar system for determining an objects range and direction.

FIG. 3 is a simplified drawing depicting the problem solved by the present invention.

FIG. 4 is a simplified drawing showing how a plurality of retroreflectors are attached to an object prior to deployment in order to employ the technique of the present invention.

FIG. 5 is a drawing showing the vectors to one retroreflector used in the calculations for determining the orientation of a remotely disposed object.

DETAILED DESCRIPTION OF THE INVENTION

The solution to the above-described problem is to employ a set of high resolution range measuring lasers physically arranged so as to define a reference coordinate frame and, additionally, equip the object whose configuration is to be defined with a plurality of surfaces capable of reflecting the range measuring laser beams back to their sources (i.e. retroreflectors). The retroreflectors are placed at known locations on the surface of the object. Then, from the range data obtained and the coordinate locations of the sources, calculate the coordinates of each retroreflecting surface, and thus determine the configuration of the object.

FIG. 4 is a simplified drawing depicting how a plurality of retroreflectors 26 are attached to the object 28. Such retroreflectors are well known to those skilled in the art and, therefore, will not be described in any detail herein in the interest of simplicity and the avoidance of redundancy. There are a plurality of reflecting surfaces on the object 28 provided by the retroreflectors 26; which may be small retroreflectors, such as corner reflectors.

FIG. 5 illustrates the method of determining the coordinates of each retroreflector 26 mounted on the object 28 whose configuration or orientation is to be determined in terms of the coordinate frame, generally indicated as 32, defined by the three range measuring lasers 30. Laser range finders as employed for the lasers 30 are a relatively recent development; but, are well known to those skilled in the art. Thus, like the retroreflectors 26, they will not be described in any detail herein in the interest of simplicity and the avoidance of redundancy.

For convenience, the three lasers 30 are labelled "A", "B", and "C". Note that the lasers 30 are located orthogonally such that laser "B" defines the origin of the reference coordinate frame 32, "A" defines the X axis 34, and "C" defines the Y axis 36. The Z axis 38 is, of course, normal to the plane defined by the three range measuring lasers 30 (i.e. "A", "B", and "C"). For clarity and simplicity, only one retroreflector 26 is illustrated in FIG. 5, it being understood that the calculations involving all retroreflectors are carried out by the same method. Once the calculations are completed, the complete set of coordinates of all the reflecting surfaces defines the configuration of the object.

For purposes of calculation, the space defined by the coordinate frame is divided into four quadrants; location of the retroreflector within a particular quadrant determines the value of variables qx and qy used in the calculations as follows:

| Quadrant | X polarity | Y polarity | qx value | qx value |
|---|---|---|---|---|
| I | positive | positive | 0 | 0 |
| II | positive | negative | 1 | 0 |
| III | negative | negative | 1 | 1 |
| IV | negative | positive | 0 | 1 |

The values of X, Y, and Z are defined as positive going towards A and C from B; and, Z is taken as positive going upward from the X-Y plane.

The measured ranges from each range measuring laser 30 to the retroreflector 26 of FIG. 5 (designated as retroreflector #1) are indicated as RA1, from laser A; RB1 from laser B; and RCI from laser C. Similarly, ranges to other retroreflectors would bear their number designation, as for example; $RA_n$ would be the measured range to retroreflector "n" from laser A. The three measured ranges serve as the basis of coordinate determination according to the following geometric calculations, which are repeated for each retroreflector 26, in determining object configuration.

As depicted in FIG. 5, the angle a1x between the X axis 34 and the measured range RB1 is calculated by:

$$a1x = \frac{Cos^{-1}[(RB1)^2 + (ab)^2 - (RA1)^2]}{2ab(RB1)}$$

The X axis coordinate of retroreflector 1, x1, is evaluated as follows:
$$x1 = (RB1)[Cos(a1x)][(-1)^{qx}]$$

Similarly, angle a1y, the angle between the Y axis 36 and measured range RB1, is calculated by:

$$a1y = \frac{Cos^{-1}[(RB1)^2 + (bc)^2 - (RC1)^2]}{2bc(RB1)}$$

This is used to calculate the Y axis coordinate of retroreflector 1, y1, by:
$$y1 = (RB1)[Cos(a1y)][(-1)^{qy}]$$

The Z axis coordinate of retroreflector 1, z1, is then calculated directly by:
$$z1 = [(RB1)^2 - (x1)^2 = (y1)^2]^{-1}$$

Again, the foregoing calculations are repeated for each retroreflector 26. The resulting full set of coordinates thus define the configuration/orientation of the object 28 as well as its location in space according to the coordinate frame 32 determined by the placement of the range measuring lasers 30.

I claim:
1. The method of determining the orientation and location of an object with respect to an X, Y, Z coordinate frame comprising the steps of:
  (a) equipping the exterior surface of the object with a plurality of retroreflector surfaces capable of reflecting range measuring laser beams back to their sources;
  (b) locating three lasers, "A", "B", and "C", orthogonally to one another such that laser "B" defines an origin of the reference coordinate frame, laser "A" with respect to laser "B" defines an X axis, and laser "C" with respect to laser "B" defines a Y axis such that a Z axis is normal to a plane defined by the three lasers;

(c) employing the lasers to determine the range distance and angle from each of the three lasers to each retroreflector surface within the coordinate frame by reflecting laser beams from the retroreflector surfaces and then receiving and processing reflected laser beams to develop range data; and, (d) employing the range distance and angle data from each of the three lasers obtained from step (c) to calculate the coordinates of each retroreflecting surface within the coordinate frame whereby the orientation and location of the object within the coordinate frame is determined.

2. The method of claim 1 wherein said step (d) thereof of employing the range data obtained from step (c) thereof to calculate the coordinates of each retroreflecting surface within the coordinate frame comprises the steps of:

(a) dividing the space defined by the coordinate frame into four quadrants as defined in step (b) hereafter;

(b) for each retroreflector, using the location of the retroreflector within a particular quadrant to determine the value of variables qx and qy to be used in association therewith according to the following relationship,

| Quadrant | X polarity | Y polarity | qx value | qx value |
|---|---|---|---|---|
| I | positive | positive | 0 | 0 |
| II | positive | negative | 1 | 0 |
| III | negative | negative | 1 | 1 |
| IV | negative | positive | 0 | 1 | where the values of X, Y, and Z are defined as positive going towards lasers A and C from laser B and Z is taken as positive going upward from the X-Y plane; and for each retroreflector$_n$, (c) designating the measured ranges from the laser to the retroreflector as $RA_n$, from laser A, $RB_n$ from laser B and $RC_n$ from laser C; and, (d) calculating the positional values according to the following geometric relationships, (di) the angle alx between the X axis and the measured range $RB_n$ being, $$alx = \frac{Cos^{-1}[(RB_n)^2 + (ab)^2 - (RA_n)^2]}{2ab(RB_n)}$$

(d2) the X axis coordinate $X_1$ of the retroreflector being, $$x1 = (RB_n)[COS(alx)][(-1)^{qx}]$$

(D3) the angle aly between the Y axis and the measured range $RB_n$ being, $$aly = \frac{Cos^{-1}[(RB_n)^2 + (bc)^2 - (RC_n)^2]}{2bc(RB_n)}$$

(d4) the Y axis coordinate $Y_1$ of the retroreflector being, $$y1 = (RB_n)[][(-1)^{qy}]; \text{ and,}$$

(d5) the Z axis coordinate $z_1$ of the retroreflector being, $$z1 = [(rB_n)^2 - (x1)^2 - (y1)^2]^{-1}.$$

3. The method of determining the orientation and location of an object with respect to an X, Y, Z coordinate frame comprising the steps of:

(a) equipping the exterior surface of the object with a plurality of retroreflector surfaces capable of reflecting range measuring laser beams back to their sources;

(b) locating three lasers, "A", "B", and "C", orthogonally to one another such that laser "B" defines an origin of the reference coordinate frame, laser "A" with respect to laser "B" defines an X axis, and laser "C" with respect to laser "B" defines a Y axis such that a Z axis is normal to a plane defined by the three lasers whereby to define the reference coordinate frame;

(c) employing the lasers to determine the range distance and angle from each of the three lasers to each retroreflector surface within the coordinate frame by reflecting laser beams from the retroreflector surfaces and then receiving and processing reflected laser beams to develop range data which is the range distance and angle from each of the three lasers to each retroreflector surface within the coordinate frame;

(d) dividing the space defined by the coordinate frame into four quadrants as defined in step (e);

(e) for each retroreflector, using the location of the retroreflector within a particular quadrant as determined from the range data from step (c) to determine the value of variables qx and qy to be used in association therewith according to the following relationship,

| Quadrant | X polarity | Y polarity | qx value | qx value |
|---|---|---|---|---|
| I | positive | positive | 0 | 0 |
| II | positive | negative | 1 | 0 |
| III | negative | negative | 1 | 1 |
| IV | negative | positive | 0 | 1 | where the values of X, Y, and Z are defined as positive going towards lasers A and C from laser B and Z is taken as positive going upward from the X-Y plane; and for each retroreflectorn, (f) designating the measured ranges from the laser to the retroreflector as $RA_n$, from laser A, $RB_n$ from laser B and $RC_n$ from laser C; and, (g) calculating the positional values according to the following geometric relationships,
(g) calculating the positional values according to the following geometric relationships, (g1) the angle alx between the X axis and the measured range $RB_n$ being, $$alx = \frac{Cos^{-1}[(RB_n)^2 + (ab)^2 - (RA_n)^2]}{2ab(RB_n)}$$

(g2) the X axis coordinate x1 of the retroreflector being, $$1 = (RB_n)]Cos(alx)[][(-1)^{qx}]$$

(g3) the angle aly between the Y axis and the measured range $RB_n$ being, $$aly = \frac{\text{Cos}^{-1}[(RB_n)^2 + (bc)^2 - (RC_n)^2]}{2bc(RB_n)}$$

(g4) the Y axis coordinate y1) of the retroreflector being, $$y1 = [(RB_n)^2 - (x1)^2 - (y1)^2]^{-1},$$

whereby the orientation and location of the object within the coordinate frame is determined.

* * * * *